US008344539B1

(12) United States Patent
Wilson

(10) Patent No.: US 8,344,539 B1
(45) Date of Patent: Jan. 1, 2013

(54) POWER GENERATING SYSTEM

(76) Inventor: Gregory C. Wilson, Dunedin, FL (US)

( * ) Notice: Subject to any disclaimer, the term of this patent is extended or adjusted under 35 U.S.C. 154(b) by 381 days.

(21) Appl. No.: 12/803,178

(22) Filed: Jun. 21, 2010

(51) Int. Cl.
*F03D 3/00* (2006.01)
(52) U.S. Cl. .................................................. 290/55
(58) Field of Classification Search ............. 290/55
See application file for complete search history.

(56) References Cited

U.S. PATENT DOCUMENTS

| 4,476,397 A * | 10/1984 | Lawson ........................ 290/54 |
| 6,254,034 B1 * | 7/2001 | Carpenter ................. 244/153 R |
| 7,504,741 B2 * | 3/2009 | Wrage et al. ..................... 290/55 |
| 7,626,281 B2 * | 12/2009 | Kawai ............................ 290/54 |
| 7,656,053 B2 * | 2/2010 | Griffith et al. ................. 290/44 |
| 8,142,154 B2 * | 3/2012 | Gartner ........................... 416/81 |
| 2007/0126241 A1 * | 6/2007 | Olson ............................ 290/55 |
| 2008/0036214 A1 * | 2/2008 | Newman ....................... 290/55 |
| 2010/0032956 A1 * | 2/2010 | Varrichio et al. .............. 290/55 |
| 2010/0276939 A1 * | 11/2010 | Clynes .......................... 290/55 |

FOREIGN PATENT DOCUMENTS

FR 2620172 A1 * 3/1989

* cited by examiner

*Primary Examiner* — Joseph Waks

(57) ABSTRACT

A drive shaft is supported at first and second ends with bearings for rotational reciprocation. A sail has a fixed portion and a reciprocable portion. An inextensible cord couples the reciprocable portion of the sail to the drive shaft adjacent to the first end whereby wind contacting the sail will reciprocate the reciprocable portion of the sail to pull the inextensible cord and rotate the drive shaft. A generator is rotatably coupled to the drive shaft adjacent to the second end for creating electrical energy in response to the reciprocation of the sail from the action of the wind.

10 Claims, 9 Drawing Sheets

POWER GENERATING SYSTEM

BACKGROUND OF THE INVENTION

1. Field of the Invention

The present invention relates to a power generating system and more particularly pertains to capturing wind energy and for effecting reciprocating and rotating movements in response to such capturing and for converting such reciprocating and rotational movement to electrical energy. The capturing and effecting and converting is done in a safe, ecologically friendly, convenient and economical manner.

2. Description of the Prior Art

The use of power generating systems of known designs and configurations is known in the prior art. More specifically, power generating systems of known designs and configurations previously devised and utilized for the purpose of capturing wind energy for generating electrical energy are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe a power generating system that allows capturing wind energy and for effecting reciprocating and rotating movements in response to such capturing and for converting such reciprocating and rotational movement to electrical energy.

In this respect, the power generating system according to the present invention substantially departs from the conventional concepts and designs of the prior art, and in doing so provides an apparatus primarily developed for the purpose of capturing wind energy and for effecting reciprocating and rotating movements in response to such capturing and for converting such reciprocating and rotational movement to electrical energy.

Therefore, it can be appreciated that there exists a continuing need for a new and improved power generating system which can be used for capturing wind energy and for effecting reciprocating and rotating movements in response to such capturing and for converting such reciprocating and rotational movement to electrical energy. In this regard, the present invention substantially fulfills this need.

SUMMARY OF THE INVENTION

In view of the foregoing disadvantages inherent in the known types of power generating systems of known designs and configurations now present in the prior art, the present invention provides an improved power generating system. As such, the general purpose of the present invention, which will be described subsequently in greater detail, is to provide a new and improved power generating system and method which has all the advantages of the prior art and none of the disadvantages.

To attain this, the present invention essentially comprises a power generating system for capturing wind energy and for effecting reciprocating and rotating movements in response to such capturing and for converting such reciprocating and rotating movement to electrical energy. The capturing and effecting and converting are done in a safe, ecologically friendly, convenient and economical manner. First provided is a drive shaft having a first end and a second end. The first and second ends of the drive shaft have bearings supporting the drive shaft for rotation. The drive shaft has separate independently rotatable segments along its length.

Next provided is a sail. The sail has a fixed portion and a reciprocable portion. An inextensible cord couples the reciprocable portion of the sail to the drive shaft. In this manner, wind contacting the sail will reciprocate the reciprocable portion of the sail to pull the inextensible cord and rotate the drive shaft in a first direction.

An initial operative zone is next provided adjacent to the first end of the drive shaft. The initial operative zone includes a first transfer assembly.

A first intermediate operative zone is next provided adjacent to the initial operative zone. The first intermediate operative zone includes a second transfer assembly. Each of the transfer assemblies includes a line drum supporting the inextensible cord coupled to the sail for rotating the drive shaft in a first direction. Each transfer assembly also includes a recoil drum with an elastic line coupled to a fixed point for counterrotating the transfer drum in a second direction opposite from the first direction. Each transfer assembly also includes a torque spring drum with steel springs for storing and slowly releasing torque to increase and directionally match the line drum rotation. Each transfer assembly also has a planetary gear drum with clutch jaws adapted to reverse torque rotation to the drive shaft. The planetary gear drum also has a second set of clutch jaws to preclude drive shaft rotation.

A second intermediate operative zone is next provided adjacent to the first intermediate operative zone. A final operative zone is provided adjacent to the second intermediate operative zone.

A plurality of transmission assemblies is provided. Each transmission assembly spans adjacent segments of the drive shaft and is adapted to magnify the rotational speed of the drive shaft along its length between the plurality of operative zones for magnifying the energy converted by the wind and the sails with respect to the generator. Each transmission assembly includes a planetary gear drum/torque converter with an interior sun gear, an exterior ring gear, and intermediate planetary gears. The transmission assembly is adapted to couple adjacent segments of the drive shaft.

A generator is lastly provided. The generator is rotatably coupled to the second end of the drive shaft for creating electrical energy in response to the rotation of the drive shaft through the reciprocation of the sail from the action of the wind.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved power generating system which has all of the advantages of the prior art power generating systems of known designs and configurations and none of the disadvantages.

It is another object of the present invention to provide a new and improved power generating system which may be easily and efficiently manufactured and marketed.

It is further object of the present invention to provide a new and improved power generating system which is of durable and reliable constructions.

An even further object of the present invention is to provide a new and improved power generating system which is susceptible of a low cost of manufacture with regard to both materials and labor, and which accordingly is then susceptible of low prices of sale to the consuming public, thereby making such power generating system economically available to the buying public.

Even still another object of the present invention is to provide a power generating system for capturing wind energy and for effecting reciprocating and rotating movements in response to such capturing and for converting such reciprocating and rotational movement to electrical energy.

Lastly, it is an object of the present invention to provide a new and improved power generating system having a drive shaft supported at first and second ends with bearings for rotational reciprocation. A sail has a fixed portion and a reciprocable portion. An inextensible cord couples the reciprocable portion of the sail to the drive shaft adjacent to the first end whereby wind contacting the sail will reciprocate the reciprocable portion of the sail to pull the inextensible cord and rotate the drive shaft. A generator is rotatably coupled to the drive shaft adjacent to the second end for creating electrical energy in response to the reciprocation of the sail from the action of the wind.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3A is a side elevational view of FIG. 3 while

The same reference numerals refer to the same parts throughout the various Figures.

DESCRIPTION OF THE PREFERRED EMBODIMENT

Figure 1:
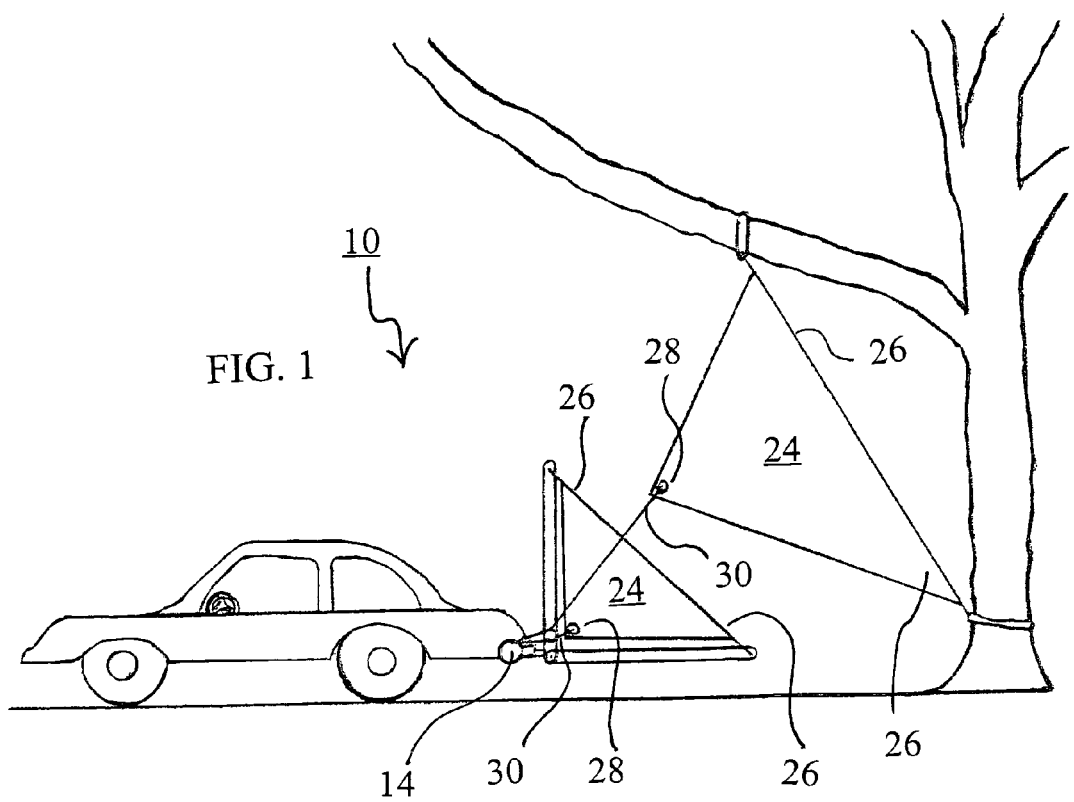
FIG. 1 is a front elevational view of a power generating system constructed in accordance with the principles of the present invention.
Figure 2:
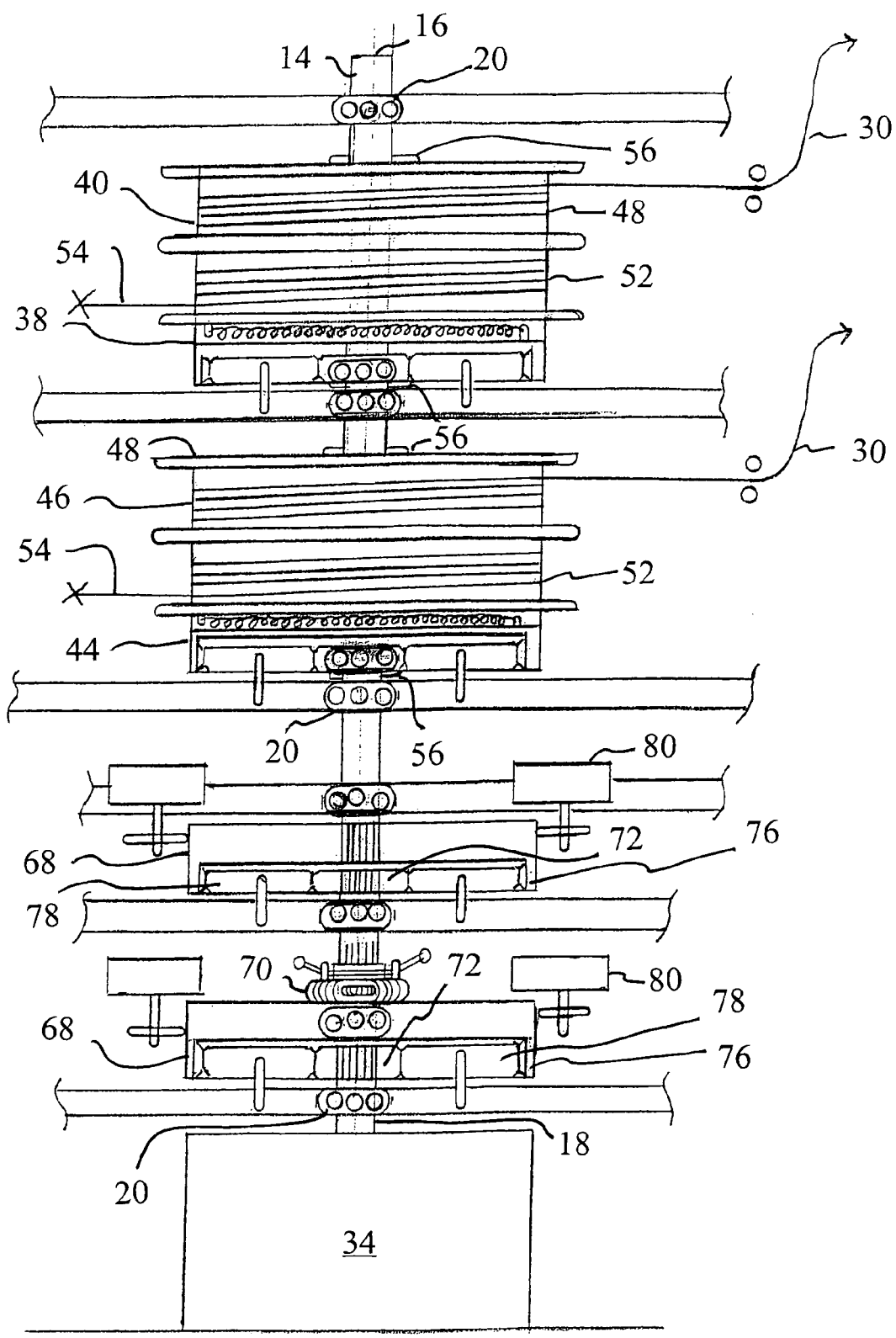
FIG. 2 is a side elevational view of the drive shaft and associated components of FIG. 1.
Figure 3:
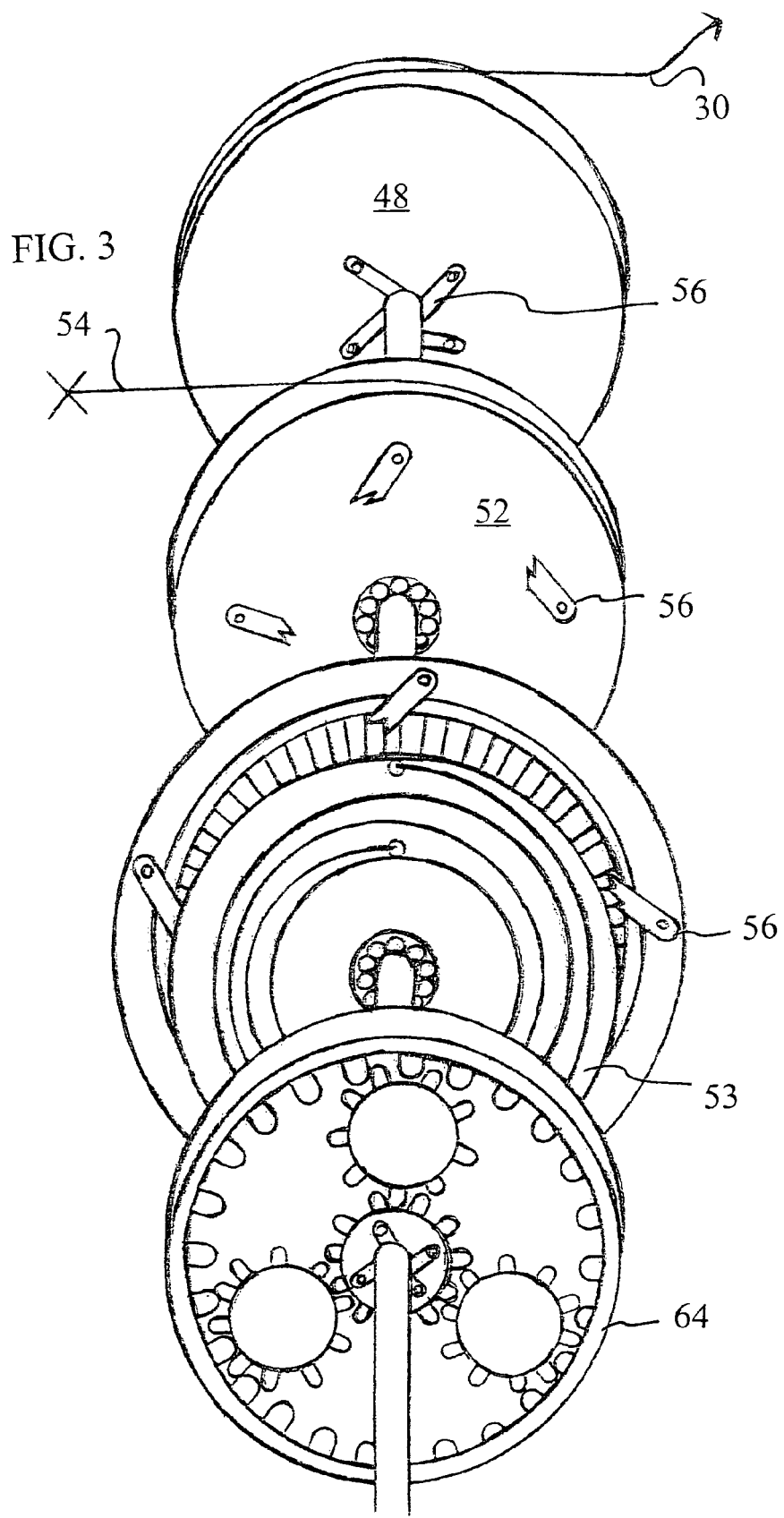
FIG. 3 is a perspective illustration of one transmission assembly and one transfer assembly employed in the system of FIGS. 1 and 2.
Figure 3B:
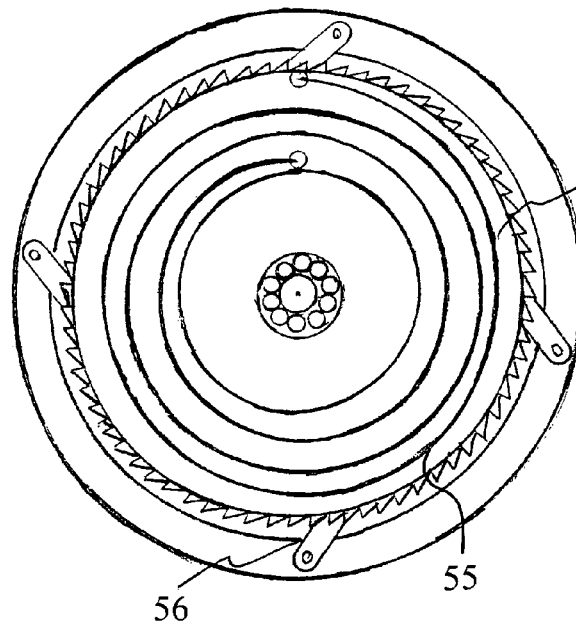
FIG. 3B is a cross-sectional view taken along line 3B-3B of FIG. 3
Figure 3A:
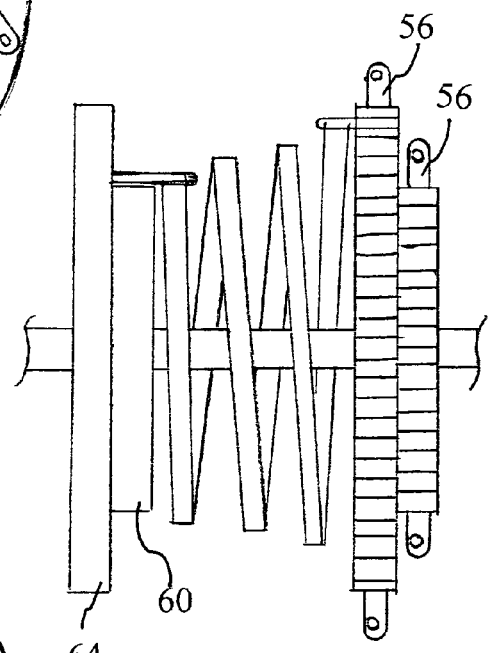
Figure 3C:
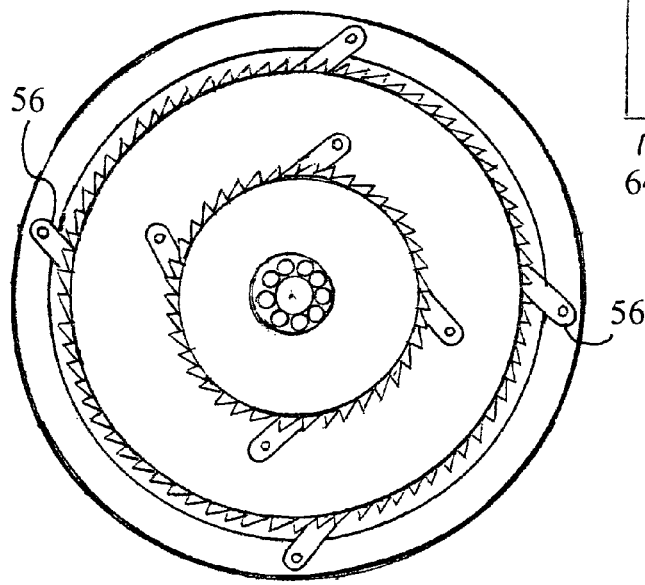
FIG. 3C is the back side of FIG. 3.

With reference now to the drawings, and in particular to FIG. 1 thereof, the preferred embodiment of the new and improved power generating system embodying the principles and concepts of the present invention and generally designated by the reference numeral (10) will be described.

The present invention, the power generating system (10) is comprised of a plurality of components. Such components in their broadest context include a drive shaft, a sail and a generator. Such components are individually configured and correlated with respect to each other so as to attain the desired objective.

The power generating system (10) of the present invention is for capturing wind energy and for effecting reciprocating and rotating movements in response to such capturing and for converting such reciprocating and rotating movement to electrical energy. The capturing and effecting and converting are done in a safe, ecologically friendly, convenient and economical manner. First provided is a drive shaft (14) having a first end (16) and a second end (18). The first and second ends of the drive shaft have bearings (20) supporting the drive shaft for rotation. The drive shaft is formed of separate independently rotatable segments along its length.

Next provided is a sail (24). The sail has a fixed portion (26) and a reciprocable portion (28). An inextensible cord (30) couples the reciprocable portion of the sail to the drive shaft. In this manner, wind contacting the sail will reciprocate the reciprocable portion of the sail to pull the inextensible cord and rotate the drive shaft in a first direction.

A generator (34) is next provided. The generator is rotatably coupled to the second end of the drive shaft for creating electrical energy in response to the rotation of the drive shaft through the reciprocation of the sail from the action of the wind.

An initial operative zone (38) is next provided adjacent to the first end of the drive shaft. The initial operative zone includes a first transfer assembly (40).

A first intermediate operative zone (44) is next provided adjacent to the initial operative zone. The first intermediate operative zone includes a second transfer assembly (46). Each of the transfer assemblies includes a line drum (48) supporting the inextensible cord (30) coupled to the sail for rotating the drive shaft in a first direction. Each transfer assembly also includes a recoil drum (52) with an elastic line (54) coupled to a fixed point for counter-rotating the transfer drum in a second direction opposite from the first direction. Each transfer assembly also includes a torque spring drum (53) with steel springs (55) for storing and slowly releasing torque to increase and directionally match the line drum rotation. Each transfer assembly also has clutch jaws (56) adapted to reverse torque rotation to the drive shaft.

A second intermediate operative zone (60) is next provided adjacent to the first intermediate operative zone. A final operative zone (64) is provided adjacent to the second intermediate operative zone.

Lastly, a plurality of transmission assemblies (68) is provided. Each transmission assembly spans adjacent segments of the drive shaft and is adapted to magnify the rotational speed of the segmented drive shaft along its length between the plurality of operative zones for magnifying the energy converted by the wind and the sails with respect to the generator. Each transmission assembly includes a planetary drum/torque converter (70) with an interior sun gear (72), an exterior ring gear (76), and intermediate planetary gears (78). Each planetary gear drum includes a generator/drive motor (80) adapted to maintain and control rpm and torque while initiating the generation of electricity. The transmission assembly is adapted to couple adjacent segments of the drive shaft. In the transmission, the consecutive planetary gear drums will connect to each input drive shaft with a torque converter.

Figure 4A:
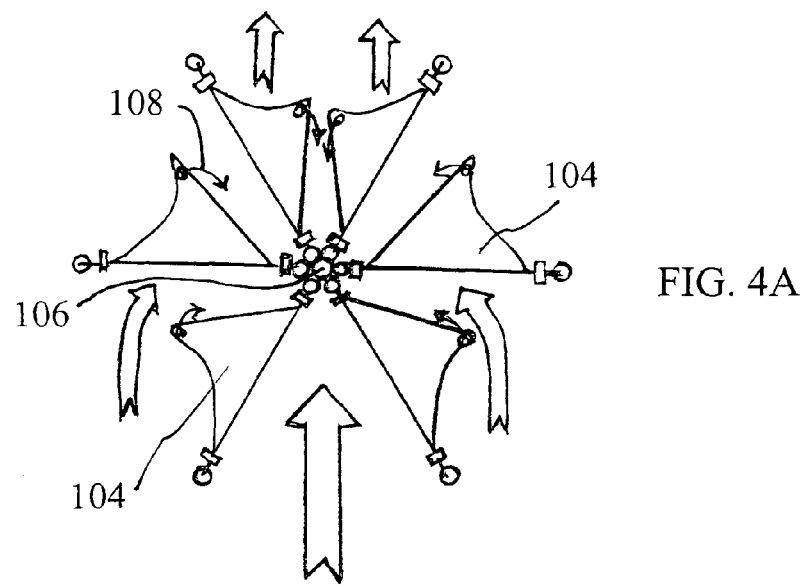
FIGS. 4 and 4A are front elevational and plan views of a power generating system constructed in accordance with an alternate embodiment of the present invention.
Figure 4:
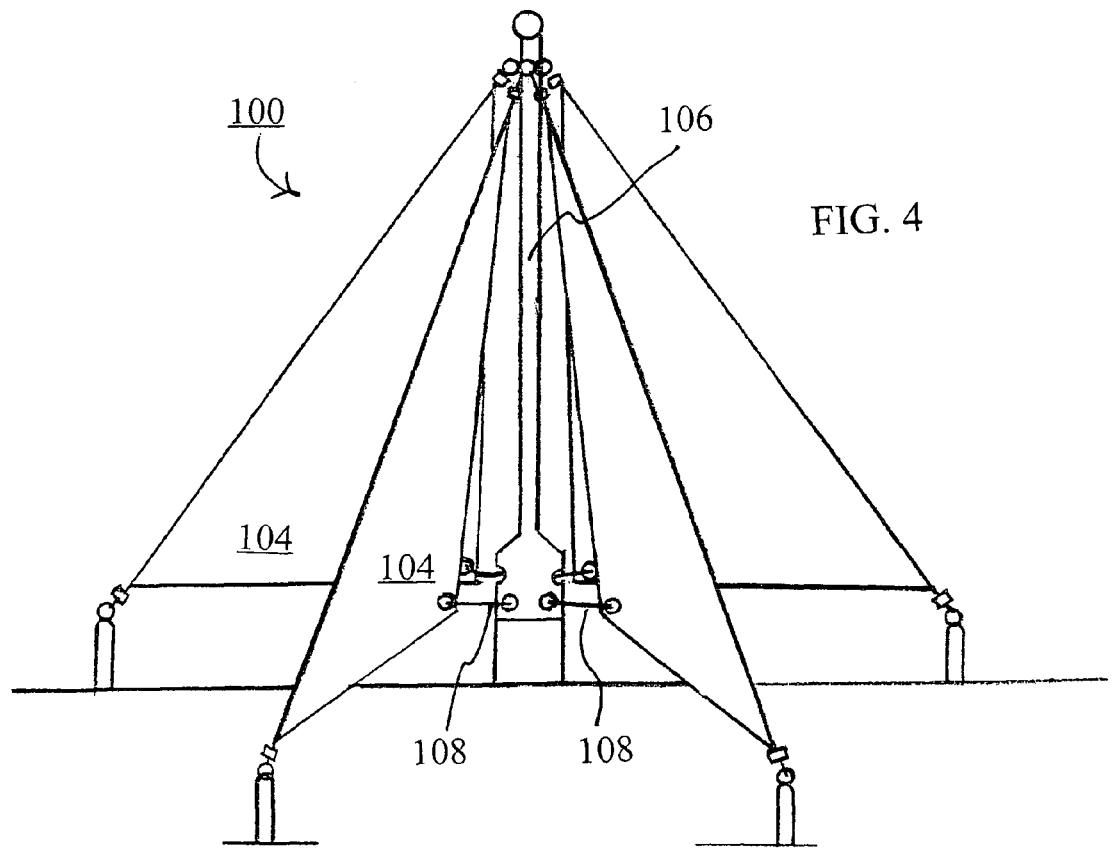
Figure 5:
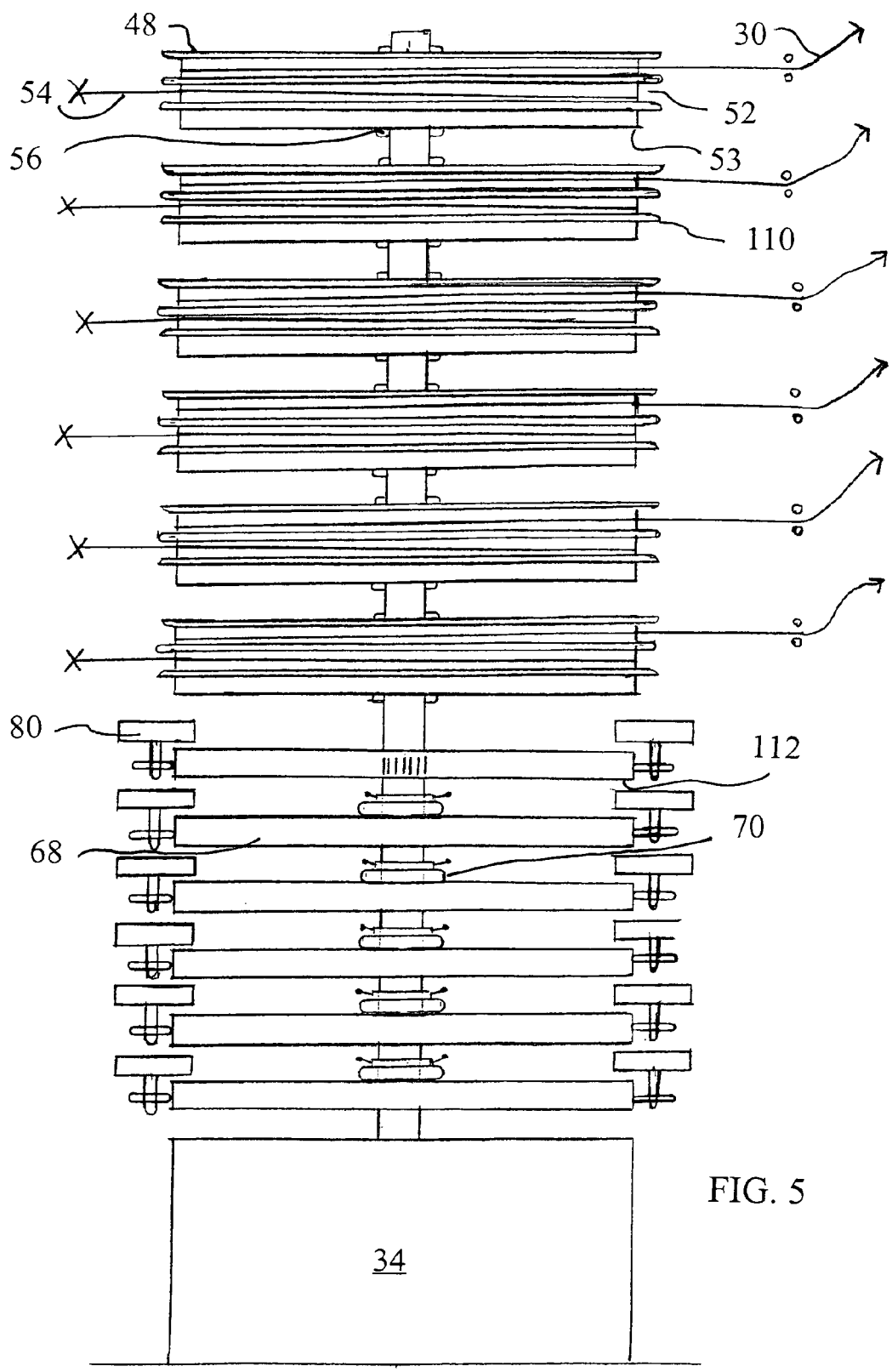
FIG. 5 is a side elevational view of the drive shaft of FIG. 4.

An alternate embodiment of the system (100) is shown in FIG. 4. In this embodiment, the sail includes a plurality of sails (104) and the drive shaft is a vertical support stand (106). A plurality of inextensible cords (108) are provided in this embodiment. Each inextensible cord is coupled to an associated transfer assembly (110) and transmission assembly (112). All of the transfer and transmission assemblies are on the common drive train.

Figure 6:
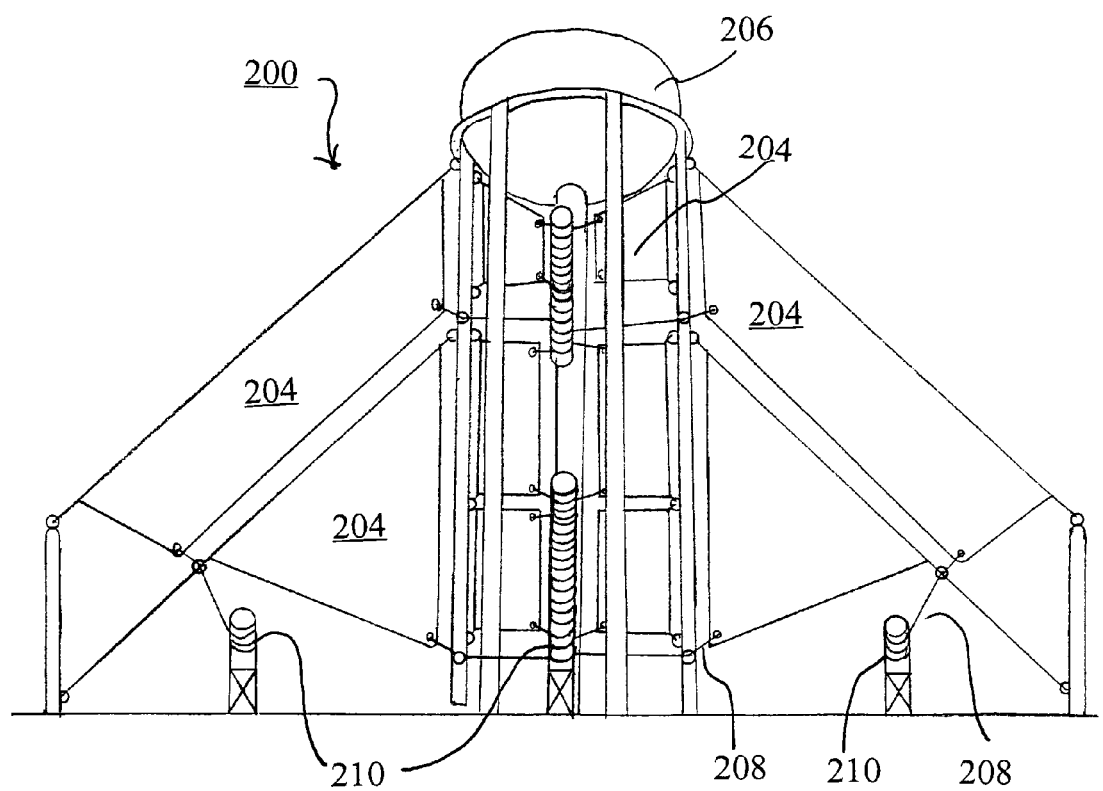
FIG. 6 is a front elevational view of a power generating system constructed in accordance with another alternate embodiment of the present invention.
Figure 7:
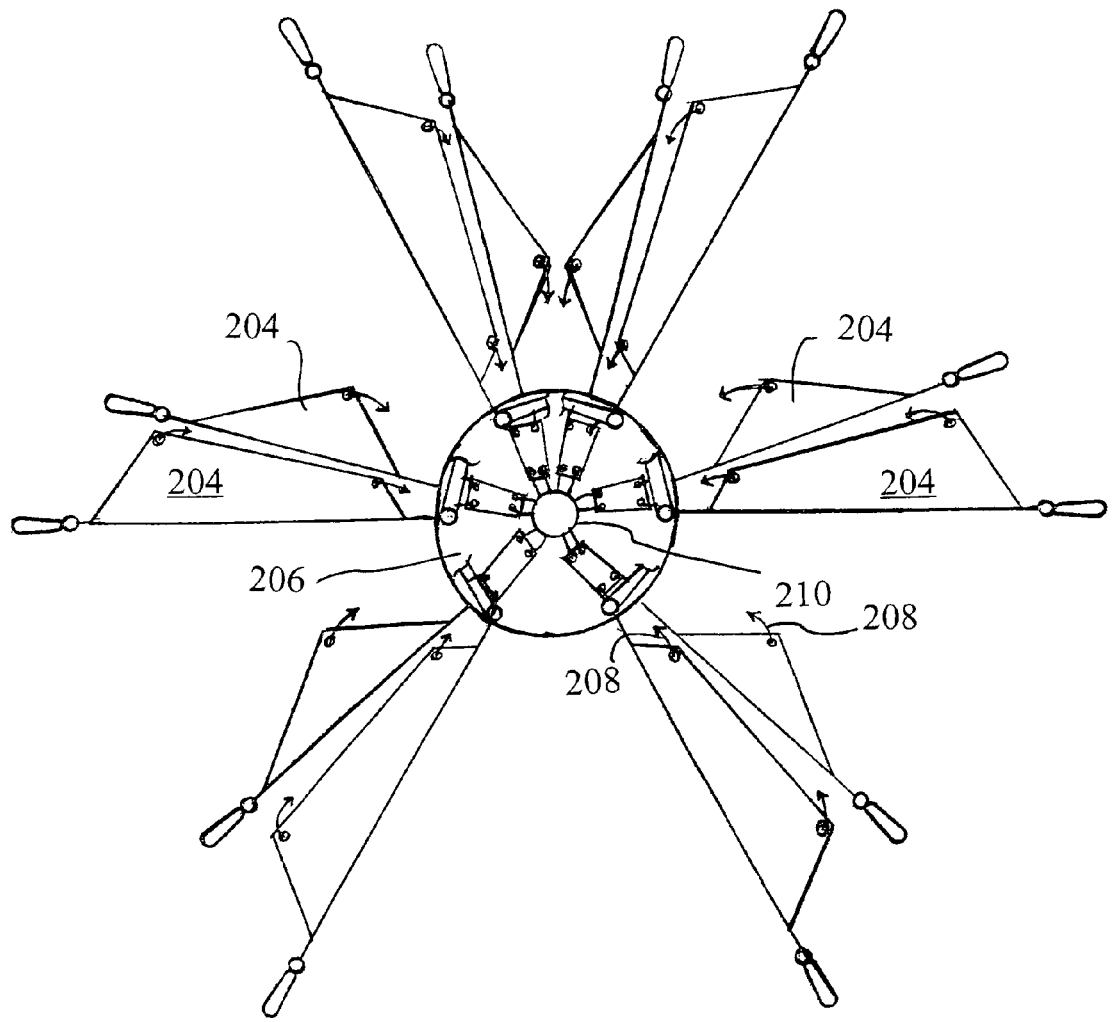
FIG. 7 is a plan view of the drive shaft of the system shown in FIG. 6.

Another alternate embodiment of the system (200) is shown in FIGS. 6 and 7. In this embodiment, a plurality of sails (204) of varying configurations are provided. Further, the drive shaft is coupled to a water tower (206). A plurality of inextensible cords (208) are provided in this embodiment. Each inextensible cord is coupled to an associated transfer assembly (210).

Figure 8:
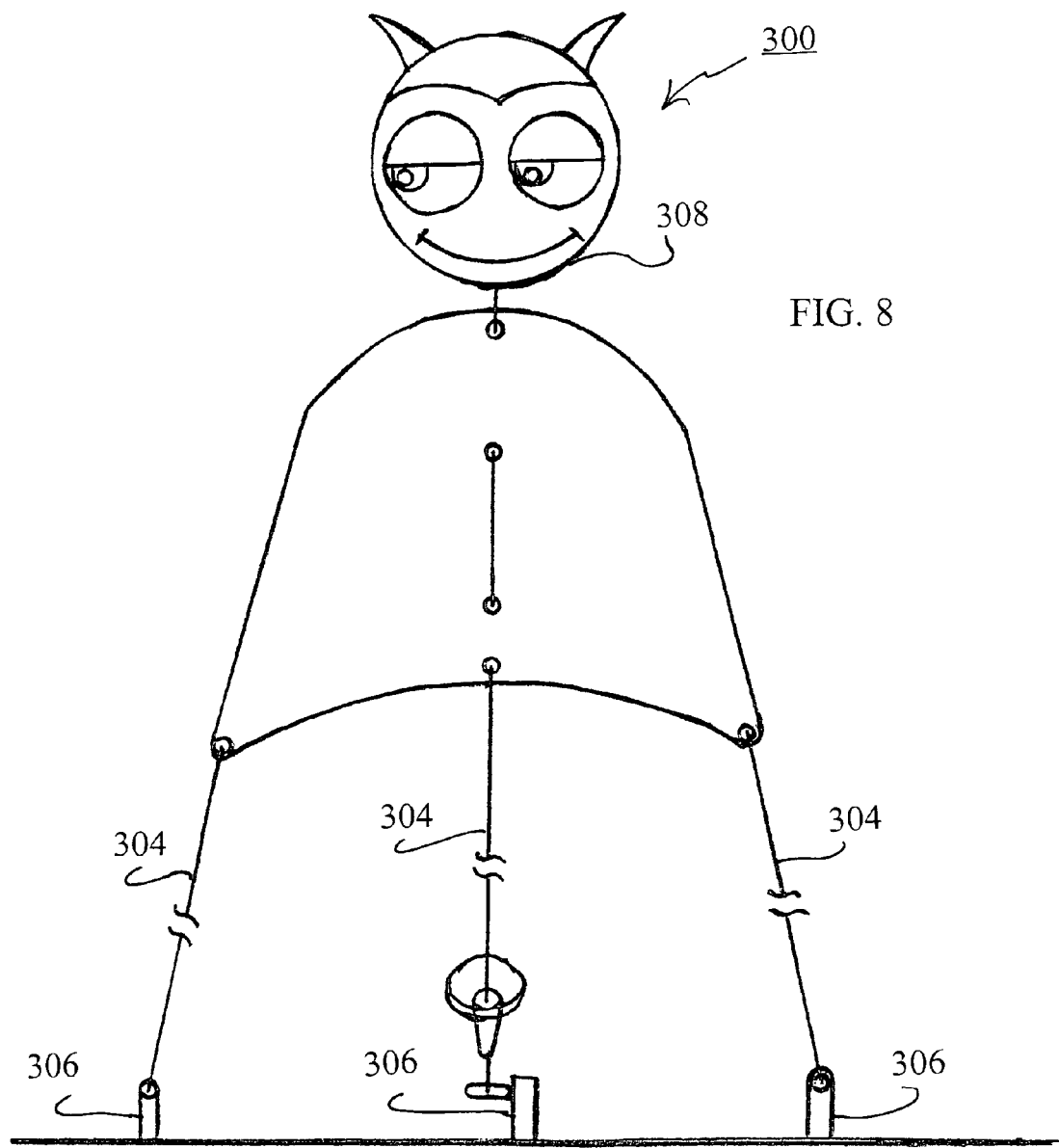
FIG. 8 is a front elevational view of a power generating system constructed in accordance with a final alternate embodiment of the present invention.

A final embodiment of the system (300) is shown in FIG. 8. A plurality of inextensible cords (304) are provided in this embodiment. Each inextensible cord is coupled to an associated transfer assembly (306). In this embodiment, a balloon (308) supports the sail.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A power generating system comprising:
   a drive shaft having first and second ends with bearings supporting the drive shaft for rotational reciprocation;
   a sail having a fixed portion and a reciprocable portion, an inextensible cord coupling the reciprocable portion of the sail to the drive shaft adjacent to the first end whereby wind contacting the sail will reciprocate the reciprocable portion of the sail to pull the inextensible cord and rotate the drive shaft; and
   a generator rotatably coupled to the drive shaft adjacent to the second end for creating electrical energy in response to the reciprocation of the sail from the action of the wind.

2. The system as set forth in claim 1 wherein the sail is coupled to a tree.

3. The system as set forth in claim 1 wherein the sail is coupled to a vehicle.

4. The system as set forth in claim 1 wherein the sail is:
   a first sail coupled to a tree with the inextensible cord coupled to a first transfer assembly; and
   a second sail coupled to a vehicle with a supplemental inextensible cord coupled to a second transfer assembly.

5. The system (100) as set forth in claim 1 wherein the sail includes a plurality of sails (104) and the drive shaft is a vertical support stand (106) and wherein the inextensible cord is a plurality of inextensible cords (108), each inextensible cord being coupled to an associated transfer assembly (110) and transmission assembly (112), all of the transfer and transmission assemblies being on the drive shaft.

6. The system (200) as set forth in claim 1 wherein:
   the sail is a plurality of sails (204) of varying configurations;
   the drive shaft is coupled to a water tower (206); and
   the inextensible cord is a plurality of inextensible cords (208), each inextensible cord being coupled to an associated transfer assembly (210).

7. The system (300) as set forth in claim 1 wherein the inextensible cord is a plurality of inextensible cords (304), each inextensible cord being coupled to an associated transfer assembly (306), the system further including a balloon (308) supporting the sail.

8. The system as set forth in claim 1 wherein the drive shaft is formed of aligned segments and further including a transmission assembly, the transmission assembly including a planetary gear drum with an interior sun gear, an exterior ring gear and intermediate planet gears, a generator/drive motor, the transmission assembly adapted to couple adjacent segments of the drive shaft for magnifying the rotational speed of the drive shaft segments.

9. The system as set forth in claim 1 and further including a transfer assembly, the transfer assembly including a transfer drum supporting the inextensible cord for rotating the drive shaft in a first direction, the transfer assembly also including a recoil drum with a metal coil spring coupled to a fixed point for counter-rotating the transfer drum in a second direction opposite from the first direction.

10. A power generating system (10) for capturing wind energy and for effecting reciprocating and rotating movements in response to such capturing and for converting such reciprocating and rotating movement to electrical energy, the system comprising, in combination:
   a drive shaft (14) having a first end (16) and a second end (18), the first and second ends having bearings (20) supporting the drive shaft for rotation, the drive shaft being formed of separate independently rotatable segments along its length;
   a sail (24) having a fixed portion (26) and a reciprocable portion (28), an inextensible cord (30) coupling the reciprocable portion of the sail to the drive shaft whereby wind contacting the sail will reciprocate the reciprocable portion of the sail to pull the inextensible cord and rotate the drive shaft in a first direction;

a generator (34) rotatably coupled to the second end of the drive shaft for creating electrical energy in response to the rotation of the drive shaft;

an initial operative zone (38) adjacent to the first end of the drive shaft, the initial operative zone including a first transfer assembly (40);

a first intermediate operative zone (44) adjacent to the initial operative zone, the first intermediate operative zone including a second transfer assembly (46), each of the transfer assemblies including a line drum (48) supporting the inextensible cord (30), each transfer assembly also including a recoil drum (52) with an elastic line (54) coupled to a fixed point for counter-rotating the transfer drum in a second direction opposite from the first direction, each transfer assembly also including a torque spring drum with steel springs for storing and slowly releasing torque to increase and directionally match the line drum rotation, each transfer assembly also having clutch jaws (56) adapted to reverse torque rotation to the drive shaft;

a second intermediate operative zone (60) adjacent to the first intermediate operative zone;

a final operative zone (64) adjacent to the second intermediate operative zone; and a plurality of transmission assemblies (68), each transmission assembly spanning adjacent segments of the drive shaft and adapted to magnify the rotational speed of the drive shaft along its length between the plurality of operative zones for magnifying the energy converted by the wind and the sails with respect to the generator, each transmission assembly including a planetary gear drum/torque converter (70) with an interior sun gear (72), an exterior ring gear (76) and intermediate planetary gears (78), a generator/drive motor (80), the transmission assembly adapted to couple adjacent segments of the drive shaft.

\* \* \* \* \*